US012689493B2

(12) United States Patent
Nimbalker et al.

(10) Patent No.: US 12,689,493 B2
(45) Date of Patent: Jul. 21, 2026

(54) METHOD AND APPARATUS FOR DETERMINING PROCESSING TIMES FOR ENHANCED CROSS-CARRIER SCHEDULING

(71) Applicant: Telefonaktiebolaget LM Ericsson (publ), Stockholm (SE)

(72) Inventors: Ajit Nimbalker, Dublin, CA (US); Ravikiran Nory, San José, CA (US); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 18/249,815

(22) PCT Filed: Oct. 22, 2021

(86) PCT No.: PCT/EP2021/079401
§ 371 (c)(1),
(2) Date: Apr. 20, 2023

(87) PCT Pub. No.: WO2022/084532
PCT Pub. Date: Apr. 28, 2022

(65) Prior Publication Data
US 2023/0396401 A1      Dec. 7, 2023

Related U.S. Application Data

(60) Provisional application No. 63/104,751, filed on Oct. 23, 2020.

(51) Int. Cl.
*H04W 16/14*      (2009.01)
*H04L 5/00*      (2006.01)
*H04W 72/12*      (2023.01)

(52) U.S. Cl.
CPC ............ *H04L 5/0094* (2013.01); *H04L 5/001* (2013.01); *H04W 16/14* (2013.01); *H04W 72/12* (2013.01)

(58) Field of Classification Search
CPC ............... H04L 5/0055; H04L 5/0023; H04W 72/0446; H04W 72/20
See application file for complete search history.

(56) References Cited

U.S. PATENT DOCUMENTS

2019/0230498 A1      7/2019  Lee et al.
2019/0289622 A1*     9/2019  Chatterjee ............. H04W 72/20
(Continued)

FOREIGN PATENT DOCUMENTS

WO      2018026165 A1      2/2018

OTHER PUBLICATIONS

"3GPP TS 38.211 V16.3.0", 3rd Generation Partnership Project; Technical Specification Group Radio Access Network; NR; Physical channels and modulation (Release 16), Sep. 2020, 1-22.
(Continued)

*Primary Examiner* — Yee F Lam
(74) *Attorney, Agent, or Firm* — Murphy, Bilak & Homiller, PLLC

(57) ABSTRACT

Methods and apparatuses provide for the determination and use of a same minimum processing time for a UE (10) with respect to scheduling the UE (10) on a scheduled carrier. In one embodiment a method includes determining (1102) a same minimum processing time for a User Equipment (UE) (10) to be at least as large as the largest one of a first minimum processing time that applies with respect to use of a first scheduling carrier to schedule the UE (10) on a scheduled carrier and a second minimum processing time that applies with respect to use of a second scheduling carrier to schedule the UE (10) on the scheduled carrier; and
(Continued)

scheduling (1104) the UE (10) on the scheduled carrier according to the same minimum processing time, irrespective of whether the first or second scheduling carrier is used for the scheduling. Determining and using a same minimum processing time that is applied commonly regardless of which scheduling carrier is used for scheduling the UE (10) on the scheduled carrier obviates the need to base scheduling decisions in the network and operating decisions at the UE (10) on legacy per-carrier minimum processing times. Use of the same minimum processing time commonly across the two scheduling carriers also avoids processing stalls or other problems that can arise at the UE (10) in cross-carrier scheduling scenarios involving multiple scheduling carriers of differing numerologies and the use of legacy per-carrier minimum processing times.

18 Claims, 5 Drawing Sheets

(56) References Cited

U.S. PATENT DOCUMENTS

| 2020/0015256 | A1  | 1/2020  | Lee et al.  |             |
| 2021/0105217 | A1* | 4/2021  | Saber       | H04W 72/51  |
| 2021/0204309 | A1* | 7/2021  | Babaei      | H04L 5/0098 |
| 2021/0204344 | A1* | 7/2021  | Babaei      | H04W 80/02  |
| 2021/0227410 | A1* | 7/2021  | Xu          | H04W 72/1263|
| 2021/0258997 | A1* | 8/2021  | Khoshnevisan| H04L 1/1854 |
| 2021/0258998 | A1* | 8/2021  | Khoshnevisan| H04L 5/0044 |
| 2021/0266095 | A1* | 8/2021  | Kumar       | H04L 1/0013 |
| 2021/0266753 | A1* | 8/2021  | Kumar       | H04W 28/0252|
| 2021/0266943 | A1* | 8/2021  | Khoshnevisan| H04W 72/535 |
| 2021/0314924 | A1* | 10/2021 | Takeda      | H04L 5/001  |
| 2021/0314993 | A1* | 10/2021 | Takeda      | H04L 5/0053 |

OTHER PUBLICATIONS

"3rd Generation Partnership Project; Technical Specification Group Radio Access Network; NR; Physical layer procedures for control (Release 15)", 3GPP TS 38.213 V15.11.0, Sep. 2020, 109 pages.

"3rd Generation Partnership Project; Technical Specification Group Radio Access Network; NR; Physical layer procedures for data (Release 15)", 3GPP TS 38.214 V15.11.0, Sep. 2020, 106 pages.

"On complexity reduction for RedCap UEs", 3GPP TSG RAN WG1 Meeting #102-E, R1-2005880, Intel Corporation, e-Meeting, Aug. 17-28, 2020, 14 pages.

"Session Notes for NR UE Features", 3GPP TSG RAN WG1 #102-e, R1-2007450, Ad-Hoc (NTT DOCOMO, Inc.), e-Meeting, Aug. 17-28, 2020, 17 pages.

"Summary of Maintenance for DL/UL Scheduling", 3GPP TSG-RAN WG1 Meeting #93, R1-1807681, Qualcomm Incorporated, Busan, Korea, May 21-25, 2018, 32 pages.

3GPP, "3rd Generation Partnership Project; Technical Specification Group Radio Access Network; NR; Physical layer procedures for control (Release 16)", 3GPP TS 38.213 V16.3.0, Sep. 2020, 1-179.

3GPP, "3rd Generation Partnership Project; Technical Specification Group Radio Access Network; NR; Physical layer procedures for data (Release 16) 3GPP TS 38.214 V16.3.0", 3GPP TS 38.214 V16.3.0, Sep. 2020, 1-166.

* cited by examiner

METHOD AND APPARATUS FOR DETERMINING PROCESSING TIMES FOR ENHANCED CROSS-CARRIER SCHEDULING

TECHNICAL FIELD

Methods and apparatus described herein relate to cross-carrier scheduling where a scheduled cell has more than one scheduling cell, such as provided for in the Fifth Generation (5G) New Radio (NR) specifications.

BACKGROUND

Carrier Aggregation

Carrier Aggregation (CA) is generally used in New Radio (NR) and LTE systems to improve data rates for transmitting to or receiving from a User Equipment (UE). Details regarding NR appear in Release 15 (Rel-15) of the Technical Specifications (TSs) promulgated by the Third Generation Partnership Project (3GPP). Release 15 defines "Fifth Generation" (5G) wireless communication networks. See, for example, 3GPP TS 38.213 V15.11.0 and 3GPP TS 38.214 V15.11.0.

With CA, the UE typically operates initially on a single serving cell called a primary cell (or PCell). The PCell is operated on a component carrier (CC) in a frequency band. The UE is then configured by the network with one or more secondary serving cells (SCell(s)). Each SCell can correspond to another CC in the same frequency band (intra-band CA) or, in inter-band CA, a frequency band that is different from the frequency band of the CC corresponding to the Pcell. For the UE to transmit/receive data on the SCell(s), e.g., receiving Downlink Shared Channel (DL-SCH) information on a Physical Downlink Shared Channel (PDSCH) or transmitting Uplink Shared Channel (UL-SCH) information on a Physical Uplink Shared Channel (PUSCH), the SCell(s) need to be activated by the network. The SCell(s) can also be deactivated and later reactivated as needed via activation/deactivation signaling.

In NR Rel-15 and Rel-16, the transmission of Downlink Control Information (DCI) to a UE schedules PDSCH on one cell. The DCI format which is carried on the Physical Downlink Control Channel (PDCCH) typically includes information about the downlink scheduling/uplink scheduling such as New Data Indicator (NDI), Modulation and Coding Scheme (MCS), Frequency Domain Resource Allocation (FDRA), Redundancy Version (RV), Multiple-Input-Multiple-Output (MIMO) information, such as number of layers, scrambling code, etc., time domain resource allocation that includes a slot and length indicator value (SLIV). The downlink DCI format also includes information about the uplink resources on which the Hybrid Automatic Repeat reQuest (HARQ) feedback information can be transmitted by the UE. This information can include the PDSCH-to-HARQ_feedback timing indicator field, the PUCCH resource index, power control commands, etc. The HARQ feedback can be carried on the PUCCH or PUSCH on a primary cell, or a Physical Uplink Control Channel (PUCCH) SCell.

Cross-Carrier Scheduling

For NR CA in Rel-15 and 16, cross-carrier scheduling (CCS) has been specified using a framework where there is only one scheduling cell for each scheduled cell. Using "cell" and "carrier" interchangeably unless otherwise noted, the existing framework provides for only one scheduling carrier for a scheduled carrier, which means that scheduling information is transmitted for the UE using the scheduling carrier, to schedule the UE for a transmission or reception on the scheduled carrier.

The UE in such CA scenarios has a primary serving cell and can be configured with one or more secondary serving cells (SCells). If a secondary cell (SCell X) is configured with a "scheduling cell" having cell index Y (i.e., cross-carrier scheduling), SCell X is referred to as the "scheduled cell". Correspondingly, the UE monitors DL PDCCH on the scheduling cell Y for assignments/grants scheduling PDSCH/PUSCH corresponding to SCell X. PDSCH/PUSCH corresponding to SCell X cannot be scheduled for the UE using a serving cell other than the scheduling cell Y.

If the SCell X is the scheduling cell for SCell X (i.e., same-carrier or "self" scheduling), the UE monitors DL PDCCH on SCell X for assignments/grants scheduling PDSCH/PUSCH corresponding to SCell X. PDSCH/PUSCH corresponding to SCell X cannot be scheduled for the UE using a serving cell other than SCell X.

An SCell cannot be configured as a scheduling cell for the primary cell. The primary cell is always its own scheduling cell.

Minimum UE Processing Time for PDSCH/PUSCH

NR specifies minimum PDSCH and PUSCH processing times for a UE based on many different factors including the numerologies of the channels involved in an operation. Thus, from the perspective of the wireless network, the term "minimum processing time" or simply "processing time" refers to the minimum allowance of time that should be observed with respect to certain resource-scheduling timing, to ensure proper operation of the UE. From the perspective of the UE, the term means that the UE should behave as specified with respect to transmitting acknowledgments or uplink data, if the scheduling timing observes the minimum processing time.

With respect to a UE receiving a PDSCH, the minimum processing time may be defined as the minimum time a UE should be given from the end of the PDSCH to the start of the uplink (e.g., beginning of the first symbol) in which the UE transmits the HARQ-feedback for the PDSCH. The involved base station (a "gNB" in NR lexicon) considers the minimum processing time when scheduling the UE with DCI that includes PDSCH resource allocation and a corresponding HARQ-ACK resource for sending feedback. If the resultant processing time is insufficient, the UE may not provide valid HARQ feedback or the UE may simply discard the DCI, etc. That is, if the timing resulting from the network's scheduling does not allow at least the applicable minimum processing time, the UE may not respond at all or correctly.

Similarly, the minimum processing time in the PUSCH context may be defined as the minimum time from end of PDCCH reception to the first symbol on the uplink (e.g., beginning of the first symbol) in which the UE transmits the PUSCH scheduled by the PDCCH. The gNB considers the minimum processing time when scheduling the UE with DCI that includes PUSCH resource allocation. If the resultant processing time is insufficient, the UE may not transmit the PUSCH or it may simply discard the DCI.

Other minimum processing times are also specified in the 3GPP standards, for example when Uplink Channel Information (UCI) is multiplexed with PUSCH, Channel State Information (CSI) computation time, Sounding Reference Signal (SRS) triggering based on DCI, etc.

The minimum processing time is typically based on UE capability, and is dependent on the numerology (e.g., sub-carrier spacing, denoted as "SCS") of the channels involved in the operation, as well as by gNB configuration (e.g., in case UE supports multiple capabilities related to processing times such as slow and fast processing times). For downlink, the minimum processing time is defined in subclause 5.3 of 3GPP TS 38.214 V16.3.0-g30, while for uplink, it is mainly captured in subclause 6.4 of 3GPP TS 38.214-g30 and subclause 9.2.5 of 3GPP TS 38.213 V16.3.0.

Downlink Processing Time

The processing time in the PDSCH context is given by $$T_{proc,1} = (N_1 + d_{1,1} + d_2)(2048 + 144) \cdot \kappa 2^{-\mu} \cdot T_C + T_{ext},$$

and denotes the minimum gap between the end of the reception of the last symbol of the PDSCH and the beginning of corresponding PUSCH/PUCCH with HARQ-ACK, where $\mu$ corresponds to the one of ($\mu$PDCCH, $\mu$PDSCH, $\mu$UL) resulting with the largest Tproc,1, where $\mu$PDCCH corresponds to the SCS of the PDCCH scheduling the PDSCH, $\mu$PDSCH corresponds to the SCS of the scheduled PDSCH, $\mu$UL corresponds to the SCS of the uplink channel with which the HARQ-ACK is to be transmitted, and k is defined in clause 4.1 of 3GPP TS 38.211 V16.3.0.

N1 is a number of symbols and is dependent on UE capability according to either capability 1 with either front-loaded DMRS configured (e.g., dmrs-AdditionalPosition=pos0) or a non-front-loaded DMRS configured (e.g., dmrs-AdditionalPosition not equal to pos0) or with capability 2 and front-loaded DMRS configured. Capability 1 and 2 may correspond to slow and fast UE processing times. The other factors d11,d2 reflect additional relaxation provided if certain conditions are satisfied.

PDSCH Processing Time for PDSCH Processing Capability 1

| $\mu$ | PDSCH decoding time $N_1$ [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

PDSCH Processing Time for PDSCH Processing Capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Uplink Processing Time

The processing time in the PUSCH context is given by $$T_{proc,2} = \max((N_2 + d_{2,1} + d_2)(2048 + 144) \cdot \kappa 2^{-\mu} \cdot T_C + T_{ext} + T_{switch}, \, d_{2,2})$$

and denotes the minimum gap between the after the end of the reception of the last symbol of the PDCCH carrying the DCI scheduling the PUSCH and the beginning of corresponding PUSCH, where $\mu$ corresponds to the one of ($\mu$DL, $\mu$UL) resulting with the largest Tproc,2

$\mu$DL corresponds to the SCS of the downlink with which the PDCCH carrying the DCI scheduling the PUSCH was transmitted $\mu$UL corresponds to the SCS of the uplink channel with which the PUSCH is to be transmitted, and k is defined in clause 4.1 of 3GPP TS 38.211 V16.3.0.

$N_2$ is the number of symbols and is dependent on UE capability according to either capability 1 or capability 2. Capability 1 and 2 may correspond to slow and fast UL processing times. The other factors d21 and d2 reflect additional relaxation provided if certain conditions are satisfied.

PUSCH Preparation Time for PUSCH Timing Capability 1

| $\mu$ | PUSCH preparation time $N_2$ [symbols] |
|---|---|
| 0 | 10 |
| 1 | 12 |
| 2 | 23 |
| 3 | 36 |

PUSCH Preparation Time for PUSCH Timing Capability 2

| $\mu$ | PUSCH preparation time $N_2$ [symbols] |
|---|---|
| 0 | 5 |
| 1 | 5.5 |
| 2 | 11 for frequency range 1 |

The minimum processing times are defined considering the cross-carrier operation, but only for the case when there is only one scheduling cell per scheduled cell.

Dynamic Spectrum Sharing and Enhanced Cross-Carrier Scheduling (SCell Scheduling PCell)

Dynamic spectrum sharing (DSS) allows an NR carrier to be deployed on same channel as an LTE carrier. FIG. 1 illustrates a DSS scenario. The diagram depicts slots for a NR PCell/PSCell (primary cell) for a DL CA capable UE operated on a carrier where the same carrier is also used for serving LTE users via dynamic spectrum sharing, and slots for another NR SCell configured for the same UE.

As shown in the figure, when a NR primary cell is operated on the same carrier on which legacy Long Term Evolution (LTE) users are served, the opportunities for transmitting PDCCH are limited due to the need to avoid overlap with LTE transmissions (e.g., LTE PDCCH, LTE PDSCH, LTE CRS).

For a UE supporting DL CA, providing the ability to use SCell PDCCH to schedule primary cell PDSCH/PUSCH (e.g., as shown by the arrows in the figure) helps in reducing the loading of primary cell PDCCH. This is referred to as enhanced cross-carrier scheduling or SCell scheduling primary cell. Particularly, the FIG. 1 depicts a CA scenario for a DL CA capable UE with a NR PCell on Frequency Division Duplex (FDD) carriers with 15 kHz subcarrier spacing (SCS) and a NR SCell on a Time Division Duplex (TDD) carrier with 30 kHz SCS. This example represents just one of the expected scenarios involving cross-carrier scheduling where the multiple scheduling carriers have differing numerologies. Other scenarios are also possible, such as the SCell being operated on a FDD band with 15 kHz. SCS.

SUMMARY

Methods and apparatuses provide for the determination and use of a same minimum processing time for a UE with respect to scheduling the UE on a scheduled carrier, irrespective of whether the UE is scheduled using a first scheduling carrier having a first numerology or a second scheduling carrier having a second numerology. Determining and using a same minimum processing time that is applied commonly regardless of which scheduling carrier is used for scheduling the UE on the scheduled carrier obviates the need to base scheduling decisions in the network and operating decisions at the UE on legacy per-carrier minimum processing times. Use of the same minimum processing time commonly across the two scheduling carriers also avoids processing stalls or other problems that can arise at the UE in cross-carrier scheduling scenarios involving multiple scheduling carriers of differing numerologies and the use of legacy minimum processing times that are specific to the individual scheduling carriers.

Particularly, a UE is expected to operate normally as long as the timing of a scheduled transmission conforms with a calculated minimum processing time that is a function of several variables, including the numerology of the scheduling carrier used to schedule the scheduled transmission. Rather than determining and using legacy, per-scheduling-carrier minimum processing times, a network node and a UE according to an example embodiment determine a same minimum processing time that applies regardless of which scheduling carrier is used, with this same minimum processing time being at least as large as the largest one among the calculated legacy minimum processing times corresponding to the first and second scheduling carriers. This same minimum processing time may also be referred to as a "common minimum processing time", to emphasize that it is determined/applied irrespective of which one of multiple scheduling carriers are used to schedule the UE.

An example embodiment comprises a method of operation by a network node of a wireless communication network. The method includes determining a same minimum processing time for a UE to be at least as large as the largest one of a first minimum processing time that applies with respect to use of a first scheduling carrier to schedule the UE on a scheduled carrier and a second minimum processing time that applies with respect to use of a second scheduling carrier to schedule the UE on the scheduled carrier. The method further includes the network node scheduling the UE on the scheduled carrier according to the same minimum processing time, irrespective of whether the first or second scheduling carrier is used for the scheduling. Accounting for the same minimum processing time means, for example, ensuring that the resource allocations scheduled for the UE on the scheduled carrier provide the UE with at least the same minimum processing time, e.g., for downlink or uplink processing operations associated with transmission by the UE of Hybrid Automatic Repeat reQuest (HARQ) Acknowledgements (ACKs) or uplink data.

Another embodiment comprises a network node configured for operation in a wireless communication network.

The network node includes communication circuitry and processing circuitry operatively associated with the communication circuitry. The processing circuitry is configured to: determine a same minimum processing time for a UE to be at least as large as the largest one of a first minimum processing time that applies with respect to use of a first scheduling carrier to schedule the UE on a scheduled carrier and a second minimum processing time that applies with respect to use of a second scheduling carrier to schedule the UE on the scheduled carrier; and schedule the UE on the scheduled carrier according to the same minimum processing time, irrespective of whether the first or second scheduling carrier is used for the scheduling.

Another embodiment comprises a method performed by a UE configured for operation in a wireless communication network. The method includes the UE operating with a same minimum processing time with respect to a scheduled carrier of the wireless communication network that has two scheduling carriers of differing numerologies. The same minimum processing time here is a minimum processing time that applies irrespective of which one of the two scheduling carriers is used to schedule the scheduled carrier for the UE. "Operating" with the same minimum processing time means, for example, that the UE decides whether to process and respond to scheduling information sent by the network, in dependence on whether the involved scheduling provides for at least the same minimum processing time at the UE.

Another embodiment comprises a UE configured for operation in a wireless communication network. The UE includes communication circuitry and processing circuitry operatively associated with the communication circuitry. The processing circuitry is configured to operate the UE according to a same minimum processing time with respect to a scheduled carrier of the wireless communication network that has two scheduling carriers of differing numerologies. The common minimum processing time is applied commonly, irrespective of which one of the two scheduling carriers is used to schedule the scheduled carrier for the UE.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
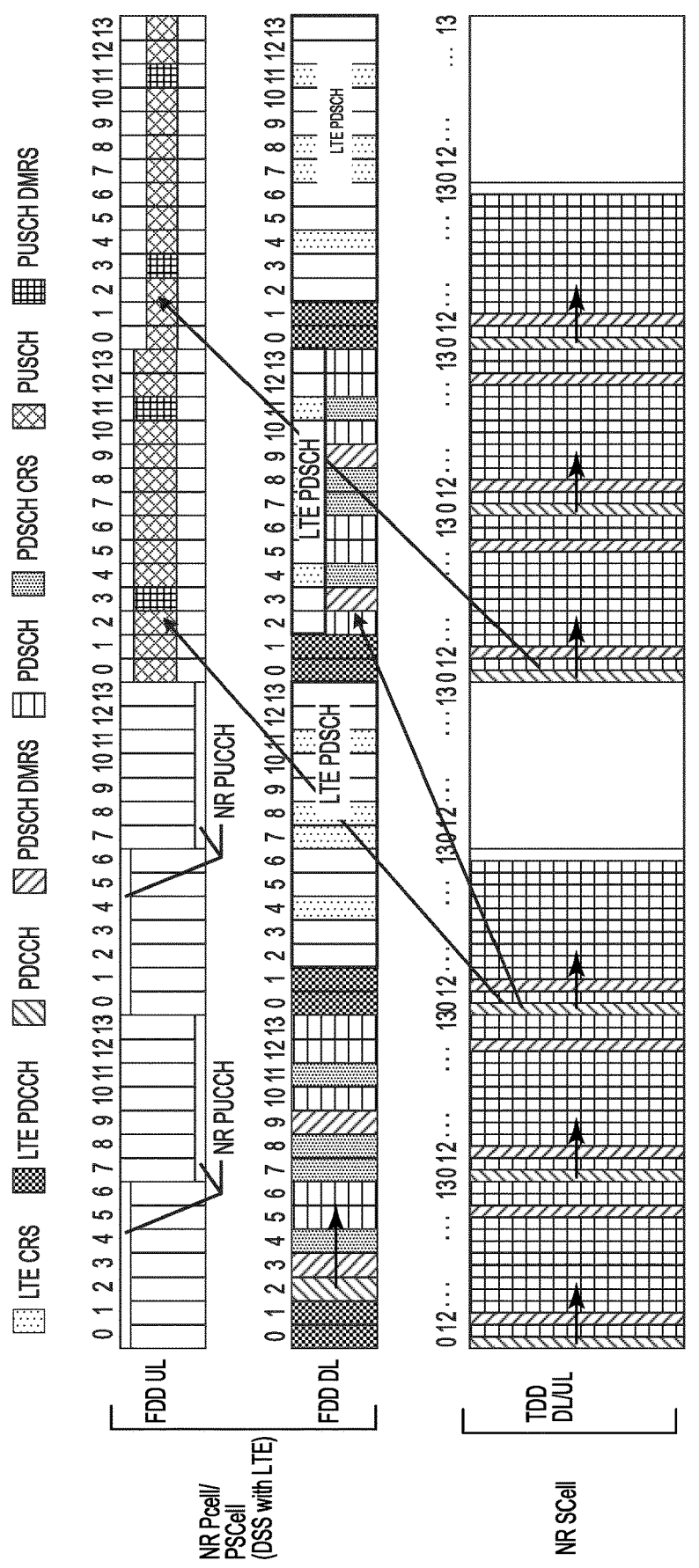
FIG. 1 is a diagram of an example arrangement for cross-carrier scheduling.

There exist certain challenges regarding the minimum-processing-time technique(s) described in the Background section. For example, in one aspect, this disclosure recognizes and addresses problems arising in a case where a scheduled cell has two scheduling cells (scheduling cell 1 and scheduling cell 2). More generally, in one or more aspects of the present disclosure and their embodiments may provide a solution to these or other challenges.

According to one or more embodiments, when a scheduled cell of a UE has two scheduling cells, the numerologies of both scheduling cells are considered in determining the processing time for the UE for PDSCH/PUSCH on that scheduled cell. In a particular example, the numerologies of PDCCH configured on first and second scheduling cells are considered. Here, "numerology" refers at least to the involved subcarrier spacing (SCS)—i.e., the SCS of the Downlink (DL) scheduling carrier in question. Thus, one or more embodiments herein are based on determining a same minimum processing time for a UE that applies commonly, regardless of whether a first scheduling carrier with a first numerology or a second scheduling carrier with a second numerology is used to schedule the UE on a scheduled carrier. Put another way, example embodiments herein involve advantageous techniques for determining and applying a same minimum processing time for a UE with respect to scheduling the UE on a scheduled carrier, irrespective of whether the UE is scheduled using a first scheduling carrier with a first numerology or a second scheduling carrier with a second numerology.

Certain embodiments provide one or more technical advantages. For example, among other things, embodiments disclosed herein reduce UE complexity by "aligning" the processing time of the UE with respect to cross-carrier scheduling of the UE on a scheduled carrier. That is, the minimum processing time for the UE for downlink and/or uplink processing with respect to the scheduled carrier is the same, irrespective of which one of two (or more) carriers are used by the network for scheduling the UE on the scheduled carrier. Determining or applying a same minimum processing time for the UE in such a manner also provides for a simplified or improved operation at the involved network node(s), with respect to scheduling the UE.

In view of the embodiments above, the present disclosure generally includes the embodiments enumerated in the EMBODIMENTS section below or otherwise described herein, e.g., which may address one or more of the issues disclosed herein.

According to one or more such embodiments, when a scheduled cell has two scheduling cells, the numerologies of both scheduling cells are considered in determining a same minimum processing time for PDSCH/PUSCH for the scheduled cell, where the same minimum processing time applies irrespective of which scheduling cell is used to schedule the UE at any particular scheduling event or occasion. In particular, the numerologies of PDCCH configured on first and second scheduling cells are considered when determining the same minimum processing time— e.g., the same minimum processing time is at least as large as the largest one among the legacy minimum processing times applicable to the two scheduling cells.

The proposed technique or solution facilitates reduced-complexity implementations of a UE with respect to cases where a scheduled cell has two scheduling cells. Among other aspects, reductions in complexity flow from aligning the UE processing times between the different scheduling cells. This approach offers particular advantages in operational scenarios involving the dynamic switching of the scheduling cell used for a given scheduled cell.

Embodiments herein also include corresponding apparatuses. Embodiments herein for instance include a wireless device configured to perform any of the steps of any of the embodiments described above for the wireless device. Unless otherwise noted, the terms "wireless device" and "User Equipment" and "UE" are all interchangeable.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a UE comprising an antenna configured to send and receive wireless signals. The UE also comprises radio front-end circuitry connected to the antenna and to processing circuitry and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node configured to perform any of the steps of any of the embodiments described herein for a network node.

Embodiments also include a network node comprising processing circuitry and power supply circuitry. The processing circuitry is configured to perform any of the steps of any of the embodiments described above for the network node. The power supply circuitry is configured to supply power to the network node.

Embodiments further include a network node comprising processing circuitry. The processing circuitry is configured to perform any of the steps of any of the embodiments described above for the network node. In some embodiments, the network node further comprises communication circuitry.

Embodiments further include a network node comprising processing circuitry and memory. The memory contains instructions executable by the processing circuitry whereby the network node is configured to perform any of the steps of any of the embodiments described above for the radio node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figures 2, 3, 4:
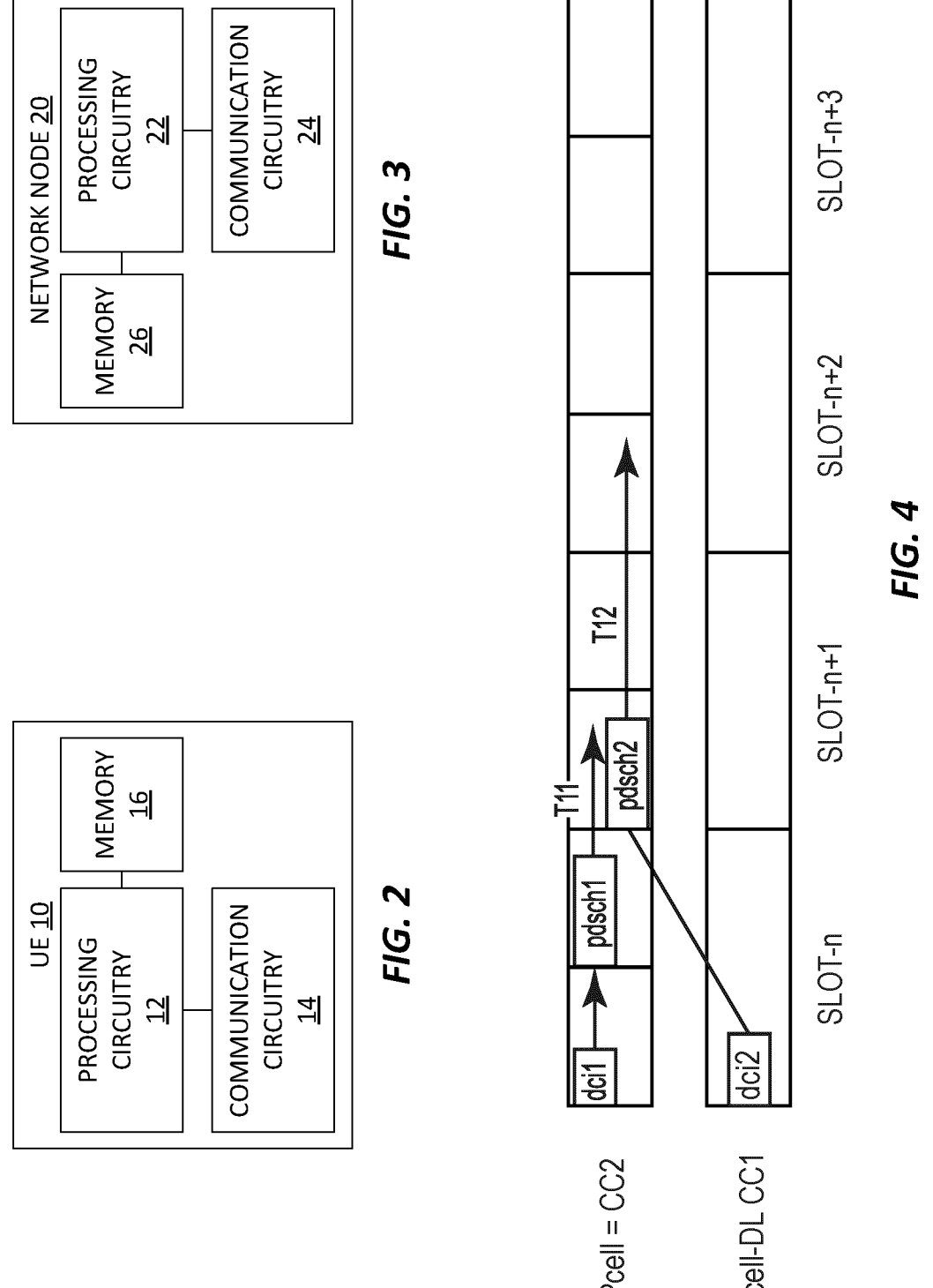
FIG. 2 is a block diagram of a User Equipment (UE) configured for operation in a wireless communication network, according to an example embodiment.
FIG. 3 is a block diagram of a network node configured for operation in a wireless communication network, according to an example embodiment.
FIGS. 4-7 are diagrams of example cross-carrier scheduling operations involving the determination of a same or common minimum processing time for a UE.

FIG. 2 for example illustrates a wireless device or UE 10 as implemented in accordance with one or more embodiments. As shown, the wireless device 10 includes processing circuitry 12 and communication circuitry 14. The communication circuitry 14 (e.g., radio circuitry) is configured to transmit and/or receive information to and/or from one or more other nodes, e.g., via any communication technology. Such communication may occur via one or more antennas that are either internal or external to the wireless device 10. The processing circuitry 12 is configured to perform processing described above, such as by executing instructions stored in memory 16. The processing circuitry 12 in this regard may implement certain functional means, units, or modules.

FIG. 3 illustrates a network node 20 as implemented in accordance with one or more embodiments. As one example, the network node 20 is a radio network node, such as a gNB operating as a base station in a Radio Access Network (RAN) configured according to 5G NR specifications.

As shown, the network node 20 includes processing circuitry 22 and communication circuitry 24. The communication circuitry 24 is configured to transmit and/or receive information to and/or from one or more other nodes and/or UEs 10, e.g., via any communication technology. The processing circuitry 22 is configured to perform processing described herein, such as by executing instructions stored in memory 26. The processing circuitry 22 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Assume a simple and typical PDSCH/PUSCH scheduling example as shown in Table 1. The table shows the legacy minimum processing times for downlink and uplink scheduling for the cases when the primary cell schedules primary cell, secondary cell schedules primary cell, and for different numerology cases. These details assume application of the same principle as current Rel-15/16 cross-carrier scheduling framework for determining the UE processing times, i.e., legacy determinations that are per-carrier, according to the particular carrier used for scheduling the UE. The table shows the processing times can be different depending on the numerologies involved for some cases.

TABLE 1

| | | Tproc1 (ms) PDSCH (non-FL DMRS, $d11 = 0$) | Tproc2 (ms) PUSCH ($d21 = 0$) |
|---|---|---|---|
| Pcell(p) = 15 kHz | p → p | T11 = 1 | T21 = 0.71 |
| SCell(s) = 30 kHz | s → p | T12 = 1 | T22 = 0.71 |
| Pcell(p) = 30 kHz | p → p | T11 = 0.43 | T21 = 0.43 |
| Scell(p) = 15 Hz | s → p | T12 = 1 | T22 = 0.71 |

With the PCell on a SCS of 15 kHz and the SCell on a SCS of 30 kHz, the processing times are same for p→p (T11/T21) and s→p (T12/T22) i.e., the UE processing pipeline can potentially work well in case of two scheduling cells.

With the PCell on a SCS of 30 kHz, and the SCell on SCS of 15 kHz, there are different processing times for p→p (T11/T21) and s→p (T12/T22), i.e., the UE processing pipeline can get negatively affected due to frequent stalls, and the use of minimum SCS "configured" across both carriers can be beneficial (e.g., for pipelining) as described herein.

FIG. 4 depicts an example of downlink processing times for case of PCell on 30 kHz, and SCell on 15 kHz. The dci1 on PCell schedules pdsch1 on the PCell. The dci2 on SCell schedules pdsch2 on the PCell. The two PDSCHs have different processing times, i.e., T11 and T12, respectively. The processing pipeline of the UE may be negatively affected due to frequent stalls/uneven processing times.

Figures 5, 6:
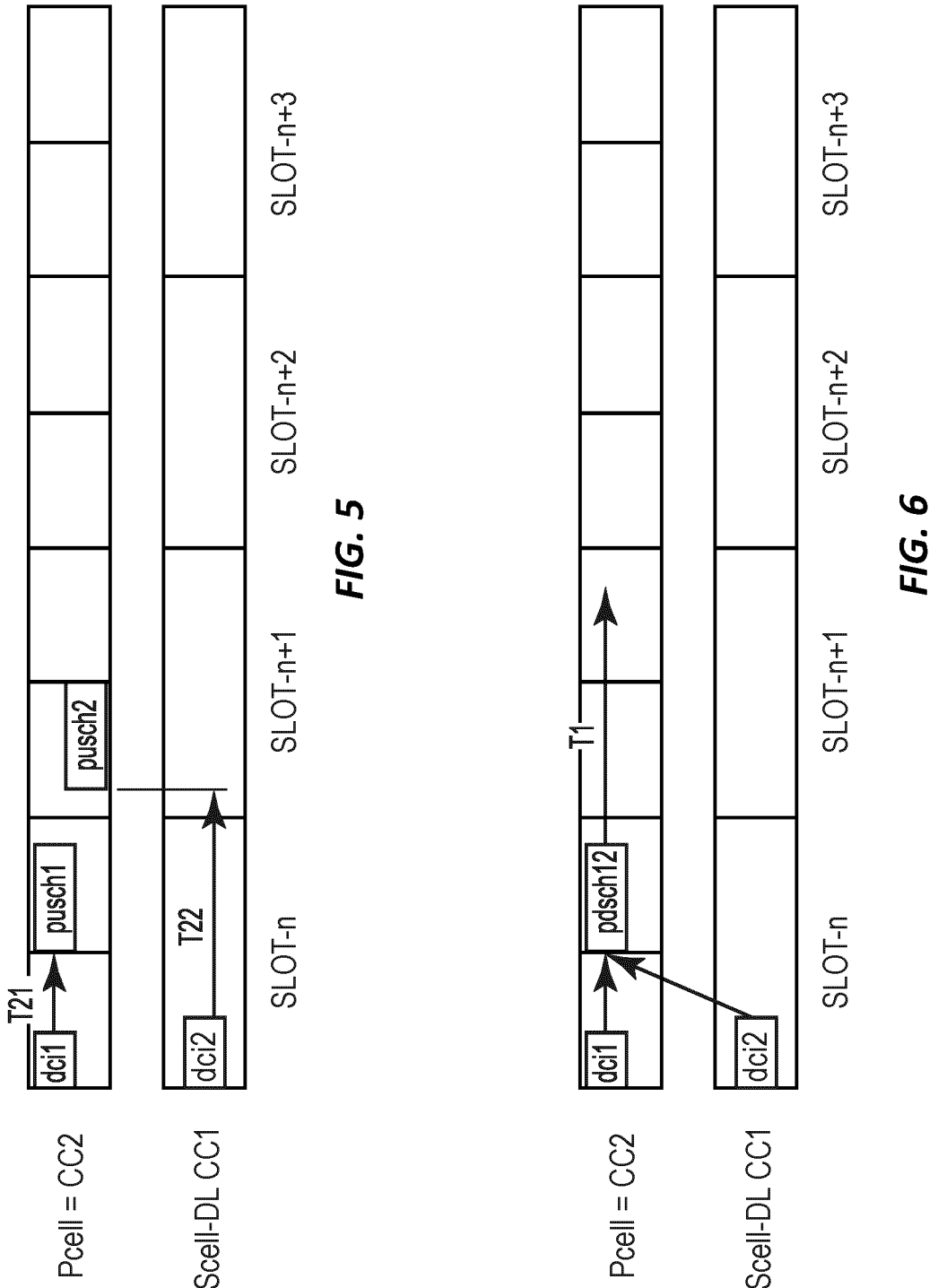

FIG. 5 shows an example of uplink processing times for case of PCell on 30 kHz, and SCell on 15 kHz. The dci1 on PCell schedules pusch1 on the PCell. The dci2 on SCell schedules pusch2 on the PCell. The two PUSCHs have different processing times, i.e., T21 and T22, respectively. The UE processing pipeline may be negatively affected due to frequent stalls/uneven processing times.

A UE can be configured with one or more serving cells (including a primary cell and one or more secondary cells). For at least one serving cell, the UE can be configured with more than one scheduling cell. UE monitors DL PDCCH on a scheduling cell for assignments/grants scheduling PDSCH/PUSCH corresponding to scheduled cell. For the serving cell with more than one scheduling cell, the UE monitors DL PDCCH on more than one scheduling cell for assignments/grants scheduling PDSCH/PUSCH corresponding to scheduled cell.

For the serving cell x that has more than one scheduling cell (scheduling cell 1 and scheduling cell 2), the PDSCH processing time for a PDSCH scheduled by scheduling cell 1 (or scheduling cell 2) is determined based on the numerologies of both the scheduling cells, i.e., scheduling cell 1 and scheduling cell 2.

In an example, the minimum subcarrier spacing of the subcarrier spacings of the scheduling cells 1 and 2 is used.

In an example, the PDSCH processing time for a PDSCH on serving cell x scheduled by a scheduling cell 1 is given by minimum (μPDCCH1, μPDSCH, μUL, μPDCCH2), where μPDCCH1 corresponds to the subcarrier spacing of the PDCCH (i.e., of scheduling cell 1) that schedules the PDSCH on the serving cell x, μPDSCH corresponds to the subcarrier spacing of the scheduled PDSCH on serving cell x, μUL corresponds to the subcarrier spacing of the uplink channel with which the HARQ-ACK is to be transmitted, and K is defined in clause 4.1 of 3GPP TS 38.211 V16.3.0, and μPDCCH2 corresponds to the subcarrier spacing configuration of the PDCCH configured on the other scheduling cell for cell x (i.e., scheduling cell 2).

FIG. 6 depicts an example of downlink processing times for case of PCell on 30 kHz, and SCell on 15 kHz according to example embodiments. The processing time for a PDSCH (pdsch12) on the primary cell is same regardless of whether the PDSCH is scheduled from the PCell (using dci1) or from the SCell (using dci2). The dci1 and dci2 are shown in dashed boxes as the gNB can schedule the pdsch12 using one of them and not necessarily both. The scheduled PDSCH would have same or similar processing time given by T1. The UE processing pipeline can work smoothly as the processing times are aligned.

Above the PDSCH processing time for a PDSCH on serving cell x scheduled by a scheduling cell 1 or a scheduling cell 2 is based on minimum (μPDCCH1, μPDSCH, μUL, μPDCCH2), which coincides with selecting the larger processing time given the currently standardized $N_1$ and $N_2$ values. To guarantee that the processing time is the larger one, instead of relying on the processing time resulting from minimum (μPDCCH1, μPDSCH, μUL, μPDCCH2), the involved network node or UE could determine T1=max (T11,T12). In a less preferred embodiment, T1=min(T11, T12), which would also help to mitigate pipeline stalling in the UE but requires higher UE processing capability.

In another example, for any operation (e.g., one of PDSCH/PUSCH/SRS/CSI) on serving cell x scheduled by PDCCH on scheduling cell 1, the correspondingly determined processing time is based on a reference PDCCH numerology given by min(μPDCCH1, μPDCCH2) (or, more generally, a function f (μPDCCH1, μPDCCH2)). Here, μPDCCH1 corresponds to the subcarrier spacing of the PDCCH scheduling the corresponding operation (e.g., one of PDSCH/PUSCH/SRS/CSI-RS on the serving cell), and μPDCCH2 corresponds to the subcarrier spacing configuration of the PDCCH of scheduling cell 2. Instead of using min( ) or f( ) to determine the reference numerology, the reference numerology could also be configured.

To avoid impact on legacy operations such as random access, fallback reception, etc., the proposed determination of the processing time may be performed/applied selectively, i.e., on a conditional basis. For example, the proposed determination is applicable only when the UE is scheduled with C-RNTI/CS-RNTI/MCS-C-RNTI, and/or for PDSCH/PUSCH scheduling with non-fallback DCI formats (0-1/1-1/0-2/1-2). The legacy processing time may be applicable when the UE is scheduled with fallback DCI format (0-0/1-0) and/or in common search space.

In another embodiment, an additional relaxation time (d1,3) is given for the PDSCH processing time on serving cell x when the serving cell x is configured with more than one scheduling cells. The value of additional relaxation time can be three OFDM symbols based on a reference numerology, which can be given by min(μPDCCH1, μPDCCH2), or, more generally, may be understood to be a function f (μPDCCH1, μPDCCH2). Here, μPDCCH1 corresponds to the subcarrier spacing of the PDCCH scheduling the corresponding operation (PUSCH on the serving cell x) and μPDCCH2 corresponds to the subcarrier spacing configuration of the PDCCH configured on scheduling cell 2. The additional relaxation time can be indicated by the UE as part of UE capability signaling. The additional relaxation time may be added to the larger one of the calculated minimum processing times for scheduling cells 1 and 2, with the resulting sum used as the minimum processing time.

For a serving cell x with more than one scheduling cell (scheduling cell 1 and scheduling cell 2), the preparation time for a PUSCH scheduled by scheduling cell 1 (or scheduling cell 2) is determined based on the numerologies of both scheduling cells, i.e., scheduling cell 1 and scheduling cell 2. In one example, the minimum subcarrier spacing of the subcarrier spacings of the scheduling cells 1 and 2 is used. Using the minimum one of the two subcarrier spacings can be understood as calculating the minimum processing time in dependence on the minimum one of the two subcarrier spacings and then applying/using that minimum processing time regardless of whether the UE is scheduled via scheduling cell 1 or scheduling cell 2.

In an embodiment, the PUSCH processing time for a PUSCH on serving cell x scheduled by scheduling cell 1 is given by min(μDL1, μUL, μDL2) where μDL1 corresponds to the subcarrier spacing of the downlink with which the PDCCH (i.e., of scheduling cell 1) carrying the DCI scheduling the PUSCH was transmitted, u UL corresponds to the subcarrier spacing of the uplink channel with which the PUSCH is to be transmitted, and K is defined in clause 4.1 of 3GPP TS 38.211 V16.3.0, and μDL2 corresponds to μPDCCH2 which is the subcarrier spacing configuration of PDCCH configured on scheduling cell 2.

In examples above, the PUSCH processing time for a PUSCH on serving cell x scheduled by a scheduling cell 1 or scheduling cell 2 is based on min(μDL1, μUL, μDL2) which coincides with selecting the larger processing time given the currently standardized N1 and N2 values. To guarantee that the processing time is the larger one, instead of relying on the processing time resulting from min(μDL1, μUL, μDL2), the involved network node and/or UE could determine T2=max (T21,T22). In a less preferred embodiment T2=min(T21,T22), which would also help to mitigate pipeline stalling in the UE but requires higher UE processing capability.

In another embodiment, an additional relaxation time (d2,3) is given for the PUSCH processing time on serving cell x when the serving cell x is configured with more than one scheduling cells. The value of additional relaxation time can be three OFDM symbols based on a reference numerology, which can be given by min(μPDCCH1, μPDCCH2) (or, more generally, a function f (μPDCCH1, μPDCCH2)) where μPDCCH1 corresponds to the subcarrier spacing of the PDCCH scheduling the corresponding operation (PUSCH on the serving cell x), and μPDCCH2 corresponds to the subcarrier spacing configuration of the PDCCH configured on scheduling cell 2. The additional relaxation time can be indicated by the UE as part of UE capability signaling.

Figures 7, 8, 9:
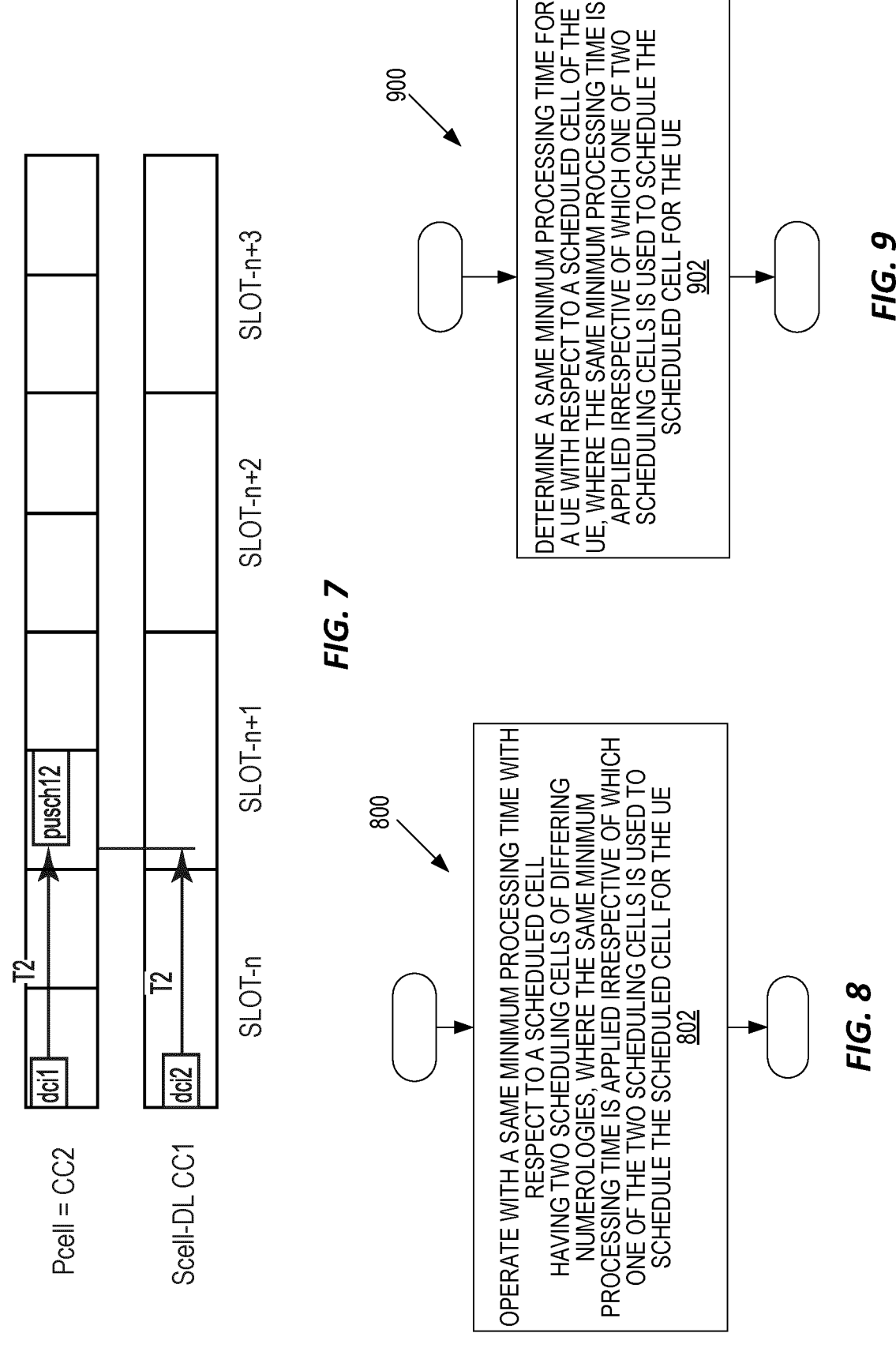
FIG. 8 is a logic flow diagram of a method of operation by a UE, according to an example embodiment.
FIG. 9 is a logic flow diagram of a method of operation by a network node, according to an example embodiment.

FIG. 7 depicts an example of uplink processing times for case of PCell on 30 kHz, and SCell on 15 kHz according to example embodiments. The processing time for a PUSCH (pusch12) on the primary cell is the same regardless of whether the PUSCH is scheduled from PCell (using dci1) or from secondary cell (using dci2). The dci1 and dci2 are shown in dashed boxes as the gNB can schedule the pusch12 using one of them and not necessarily both. The scheduled PUSCH would have same or similar processing time given by T2 (which could be the maximum of T21 and T22). The UE processing pipeline can work smoothly as the processing times are aligned—i.e., a same minimum processing time is determined/applied commonly, irrespective of the scheduling carrier used to schedule the UE on the scheduled carrier.

When the wireless communication network schedules the UE with a scheduling message providing enough processing time for PDSCH, the UE follows the scheduling message, decodes the corresponding PDSCH and provides a valid HARQ-ACK in the assigned uplink resource. In other words, the UE operates "normally" or as expected. Similarly, when the network schedules the UE with a scheduling message providing enough processing time for PUSCH, the UE follows the scheduling message, and transmits the corresponding PUSCH in the assigned uplink resource.

With the above in mind, and in the context of one or more embodiments, when a scheduled cell has two scheduling cells, the numerologies of both scheduling cells are considered in determining a same or common minimum processing time for PDSCH/PUSCH for that scheduled cell. In particular, the numerologies of PDCCH configured on first and second scheduling cells are considered, e.g., the same minimum processing time is at least as large as the largest one among the respective legacy minimum processing times that would apply for scheduling the UE via the first scheduling cell or scheduling the UE via the second scheduling cell.

FIG. 8 illustrates a method 800 performed by a wireless device, such as a UE. In at least one embodiment, the wireless device is a UE configured for operation in a 5G NR communication network. The method 800 comprises the UE operating (Block 802) with a same or common minimum processing time with respect to a scheduled cell having two scheduling cells of differing numerologies. The same minimum processing time applies irrespective of which one of the two scheduling cells is used to schedule the scheduled cell for the UE. "Operating" with the same minimum processing time irrespective of which one of the two scheduling cells is used to schedule the UE on the scheduled carrier comprises, for example, the UE assessing the scheduling timing with respect to the same minimum processing time, regardless of which scheduling carrier is used to schedule the UE on the scheduled carrier.

FIG. 9 illustrates a method 900 performed by a network node, such as a radio base station. In at least one embodiment, the network node is a radio base station configured for operation in a 5G NR communication network. The method 900 includes determining (Block 902) a same or common minimum processing time for a UE with respect to a scheduled cell of the UE. The same processing time is applied/used irrespective of which one of two scheduling cells is used to schedule the UE for the scheduled cell.

With respect to the methods 800 and 900 depicted in FIGS. 8 and 9, the scheduled cell comprises, for example, a first Component Carrier (CC) in a Carrier Aggregation (CA) configuration, and the two scheduling cells comprise the first CC and a second CC. Here, the network, e.g., a serving radio network node in the network, schedules the UE on the first CC by sending scheduling information on either the first CC or the second CC. Conventionally, the minimum processing time determined for the UE for a scheduled carrier depends on one or more numerologies associated with the scheduled carrier and one or more numerologies of the carrier used to schedule the UE on the scheduled carrier, i.e., the legacy minimum processing time is specific to the scheduling carrier.

By convention, then, in a case where there were two scheduling carriers having different relevant numerologies—i.e., different SCSs for the relevant channels—there would be two different minimum processing times for the UE, one calculated for the first one of the two scheduling carriers and one calculated for the second one of the two scheduling carriers. Disadvantageously, then, the minimum processing time for a given PDSCH or PUSCH transmission would depend on which scheduling carrier was used to schedule the UE.

Addressing that issue among others, in at least one embodiment, a first calculated minimum processing time corresponds to using the first CC to schedule the UE on the first CC and depends on one or more numerologies used by the first CC, a second calculated minimum processing time corresponds to using the second CC to schedule the UE on the first CC and depends on one or more numerologies used by the first and second CCs. In such embodiments, the network node and/or UE determine that a same minimum processing time is at least as large as the largest one of the first and second calculated minimum processing times, and the same minimum processing time is applied/used irrespective of which scheduling carrier is used to schedule the UE.

Figures 10, 11:
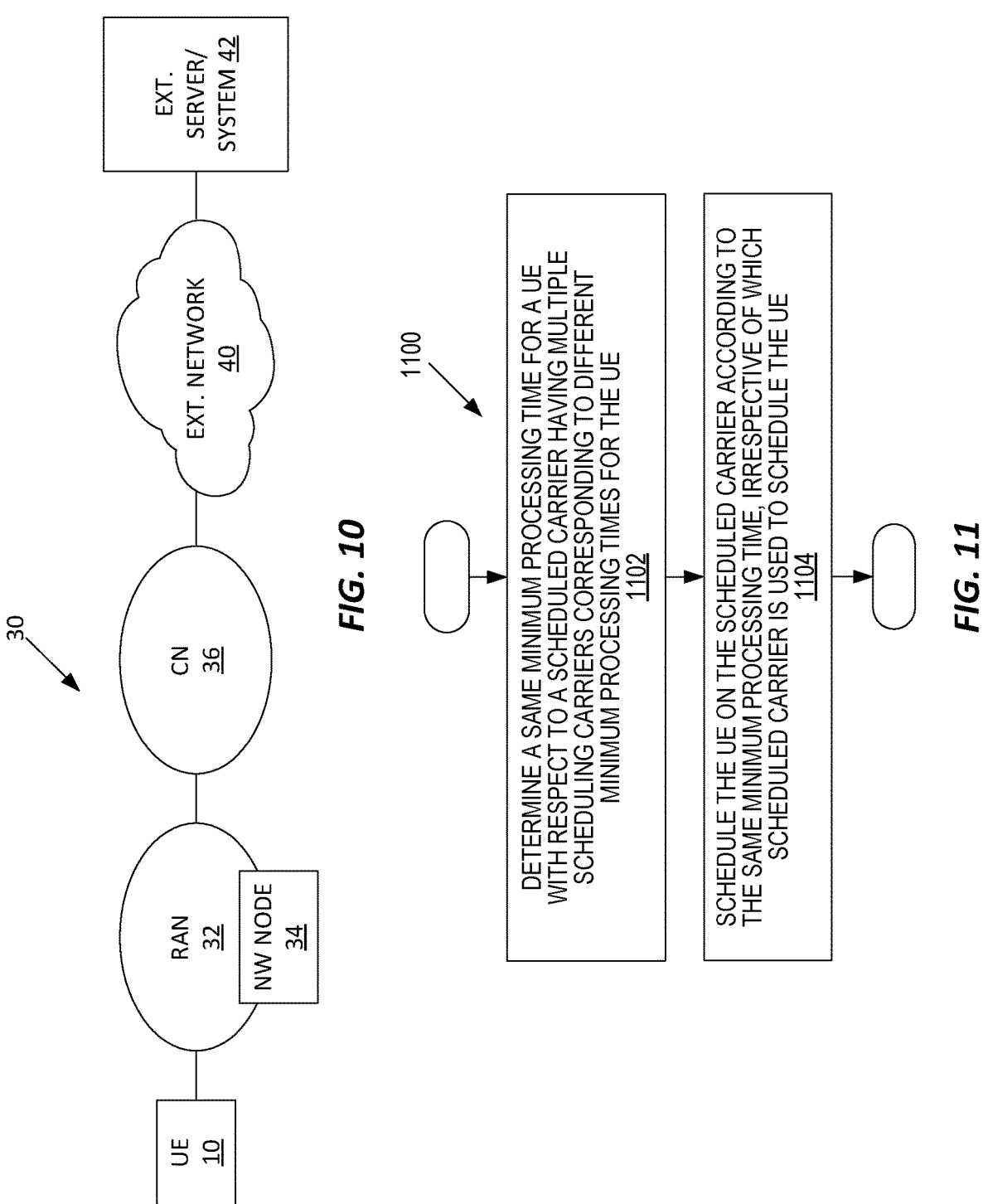
FIG. 10 is a block diagram of a wireless communication network, according to an example embodiment.
FIG. 11 is a logic flow diagram of a method of operation by a network node, according to an example embodiment.

FIG. 10 depicts an example wireless communication network 30, where, for example, the network 30 includes a Radio Access Network (RAN) 32 having one or more radio network nodes 34, e.g., base stations. The network 30 further includes a Core Network (CN) 36 that is communicatively coupled with one or more external networks 40, e.g., to provide access to external systems or servers 42. In one or more embodiments, the radio network node 34 is an example of the earlier-illustrated network node 20 and is configured to carry out the network-node operations described herein, such as performing the operations depicted in the method 900.

FIG. 11 depicts a method 1100 that may be understood as a more detailed implementation of the method 900, according to an example embodiment. A network node 20 performs the method 1100, which includes determining (Block 1102) a same or common minimum processing time for a User Equipment (UE) 10 with respect to a scheduled carrier having multiple scheduling carriers corresponding to different minimum processing times for the UE. The method 1100 further includes scheduling (Block 1104) the UE on the scheduled carrier according to the same processing time, irrespective of which scheduling carrier is used to schedule the UE.

As a particular example, there are first and second scheduling carriers and the same minimum processing time is determined to be at least as large as the largest one of a first minimum processing time that applies with respect to use of a first scheduling carrier to schedule the UE 10 on the scheduled carrier and a second minimum processing time that applies with respect to use of a second scheduling carrier to schedule the UE 10 on the scheduled carrier. As explained earlier, the first and the second minimum processing times differ as a consequence of the first and second scheduling carriers having different numerologies.

In an example, the scheduled carrier is a first Component Carrier (CC) in a Carrier Aggregation (CA) associated with the UE. The first scheduling carrier is the first CC and the second scheduling carrier is a second CC in the CA, for example. In one or more embodiments, the first CC is a first New Radio (NR) carrier operated in a spectrum-sharing arrangement and the second CC is a second NR carrier that is not operated in a spectrum-sharing arrangement. The network node 20 selectively uses either the first NR carrier or the second NR carrier to schedule the UE 10 on the first NR carrier.

As an example, scheduling (Block 1104) the UE 10 on the scheduled carrier according to the minimum processing time comprises one of: allowing at least the same minimum processing time at the UE 10 for returning an acknowledgment of a downlink transmission to the UE 10; or allowing at least the same minimum processing time at the UE 10 for beginning an uplink transmission subsequent to reception of control information scheduling the uplink transmission.

As another example, scheduling the UE 10 on the scheduled carrier according to the minimum processing time comprises applying the same minimum processing time conditionally and, when the same minimum processing time is not applied for a particular scheduling occasion, applying a legacy processing time that is specific to the particular scheduling carrier used to schedule the UE 10 on the scheduled carrier.

The same minimum processing time is applied, for example, only to scheduling occasions where one or more of the following conditions is satisfied: the UE 10 is scheduled using a Cell Radio Network Temporary Identifier (C-RNTI); the UE 10 is scheduled using a Configured Scheduling RNTI (CS-RNTI); the UE 10 is scheduled using a Modulation and Coding Scheme Cell RNTI (MCS-C-RNTI); the UE 10 is scheduled using non-fallback Downlink Control Information (DCI) formats 0-1/1-1/0-2/1-2; or the UE 10 is scheduled using a common search space. In scheduling instances or occasions in which the same minimum processing time is not applied, the network node 20 applies a legacy minimum processing time that is specific to which scheduling carrier used to schedule the UE 10.

Determining (Block 1102) a same minimum processing time for the UE 10 comprises, for example, determining the same minimum processing time as a value equal to the larger one of the first and second minimum processing times that apply for the first and second scheduling carriers. Further, in at least one embodiment, responsive to a certain condition being satisfied, determining the same minimum processing time for the UE 10 comprises determining the same minimum processing time as a value equal to the larger one of the first and second minimum processing times plus a relaxation value.

A network node 20 according to an example embodiment is configured for operation in a wireless communication network 30, e.g., the network node 20 is a radio network node 34 as shown in FIG. 10. The network node 20 includes communication circuitry 24 and processing circuitry 22 operatively associated with the communication circuitry 24. In implementations of the network node 20 as a radio network node 34, the communication circuitry 24 comprises radiofrequency circuitry for transmitting signals for UEs 10 and receiving signals from UEs 10. Additionally or alternatively, such as where the network node 20 is a core network node, the communication circuitry 24 comprises a communication interface for communicating with other nodes in the network 30, such as communicating with a radio network node that is wirelessly connected to the UE 10.

The processing circuitry 22 is configured to determine a same minimum processing time for a UE 10 to be at least as large as the largest one of a first minimum processing time that applies with respect to use of a first scheduling carrier to schedule the UE 10 on a scheduled carrier and a second minimum processing time that applies with respect to use of a second scheduling carrier to schedule the UE 10 on the scheduled carrier. Further, the processing circuitry 22 is configured to schedule the UE 10 on the scheduled carrier according to the same minimum processing time, irrespective of whether the first or second scheduling carrier is used for the scheduling.

As an example, the processing circuitry 22 is configured to schedule the UE 10 on the scheduled carrier according to the same minimum processing time by: allowing at least the same minimum processing time at the UE 10 for returning an acknowledgment of a downlink transmission to the UE 10; or allowing at least the same minimum processing time at the UE 10 for beginning an uplink transmission subsequent to reception of control information scheduling the uplink transmission.

In at least one embodiment, the processing circuitry 22 is configured to schedule the UE on the scheduled carrier according to the same minimum processing time on a conditional basis. When the same minimum processing time is not applied for a particular scheduling 10 occasion—i.e., the conditional basis for use of the same minimum processing time is not satisfied—the processing circuitry 22 is configured to apply a legacy minimum processing time that is specific to the particular scheduling carrier used to schedule the UE 10 on the scheduled carrier.

In at least one embodiment, the processing circuitry 22 is configured to apply the same minimum processing time to scheduling occasions where one or more of the following conditions is satisfied: the UE 10 is scheduled using a Cell Radio Network Temporary Identifier (C-RNTI); the UE 10 is scheduled using a Configured Scheduling RNTI (CS-RNTI); the UE 10 is scheduled using a Modulation and Coding Scheme Cell RNTI (MCS-C-RNTI); the UE 10 is scheduled using non-fallback Downlink Control Information (DCI) formats 0-1/1-1/0-2/1-2; or the UE 10 is scheduled using a common search space.

The processing circuitry 22 is configured, for example, to determine a same minimum processing time for the UE 10 as a value equal to the larger one of the first and second minimum processing times. In at least one embodiment, the processing circuitry 22 is configured to determine the same minimum processing time for the UR 10 as a value equal to the larger one of the first and second minimum processing times plus a relaxation value, but determines/applies the same minimum processing time on a conditional basis, i.e., responsive to a certain condition being satisfied.

Turning back to FIG. 8 for complementary details regarding operation at a UE 10, a UE 10 according to an example embodiment operates with a same minimum processing time with respect to a scheduled carrier of a wireless communication network 30 that has two scheduling carriers of differing numerologies. The same minimum processing time applies irrespective of which one of the two scheduling carriers is used to schedule the scheduled carrier for the UE 10. Operating with the same minimum processing time comprises, for example, the UE 10 determining, with respect to a particular scheduling occasion, whether a timing of the scheduling of the UE 10 on the scheduled carrier satisfies the same minimum timing requirement. As a further example, the UE 10 operating with a same minimum processing time comprises one of: returning an acknowledgment of a scheduled downlink transmission, responsive to a timing of the acknowledgment conforming to the same minimum processing time; or transmitting uplink data, responsive to a timing of the transmission relative to reception of downlink control information scheduling the transmission conforming to the same minimum processing time.

The UE 10 in one or more embodiments operates with a same minimum processing time only when a certain condition is satisfied. Otherwise, the UE 10 operates with legacy minimum processing times, i.e., the minimum processing time determined/applied by the UE 10 is specific to the particular scheduling carrier used to schedule the UE on the scheduled carrier. For example, with respect to first and second scheduling carriers having corresponding legacy first and second minimum processing times, the first minimum processing time is used by the UE 10 responsive to the certain condition not being satisfied and the first scheduling carrier being used to schedule the UE 10 on the scheduled carrier. The second minimum processing time is used by the UE 10 responsive to the certain condition not being satisfied and the second scheduling carrier being used to schedule the UE 10 on the scheduled carrier. These first and second minimum processing times may be understood as legacy minimum processing times—i.e., according to legacy operation, the minimum processing time is always specific to the particular scheduling carrier used to schedule the UE 10, and, of course, legacy cross-carrier scheduling provided for only one scheduling carrier per scheduled carrier.

In one example of implementing the UE method, the certain condition under which the UE 10 operates with a same minimum processing time as described herein rather than with a legacy minimum processing time is any one or more of: the UE 10 is scheduled using a Cell Radio Network Temporary Identifier (C-RNTI); the UE 10 is scheduled using a Configured Scheduling RNTI (CS-RNTI); the UE 10 is scheduled using a Modulation and Coding Scheme Cell RNTI (MCS-C-RNTI); the UE 10 is scheduled using non-fallback Downlink Control Information (DCI) formats 0-1/1-1/0-2/1-2; or the UE 10 is scheduled using a common search space.

For clarity, the same minimum processing time described herein may equal the larger of the legacy minimum processing times calculated for respective ones of the two or more scheduling carriers that are usable for scheduling the UE 10 on the scheduled carrier. However, the same minimum processing time at issue herein distinguishes from legacy minimum processing times because it is applied irrespective of which scheduling carrier is used, at least if any/all applicable conditions for its use are satisfied. That is, the same minimum processing time is a value that is determined/applied commonly, irrespective of which scheduling carrier is used.

In an example case, the same minimum processing time is a Physical Downlink Shared Channel (PDSCH) processing time and comprises the minimum gap between the end of the reception by the UE 10 of a PDSCH and the beginning of a corresponding Physical Uplink Shared Channel (PUSCH) or Physical Uplink Control Channel (PUCCH) transmission with a Hybrid Automatic Repeat reQuest Acknowledgment (HARQ-ACK) for the received PDSCH. In another example case, the same minimum processing time is a PUSCH processing time and comprises the minimum gap between the end of the reception by the UE 10 of a PDSCH carrying DCI scheduling a PUSCH and the beginning of the PUSCH.

A UE 10 configured for operation in a wireless communication network 30 comprises, for example, communication circuitry 14 configured to transmit signal to radio network node(s) 34 of the network 30 and to receive signals from such node. Further, the UE 10 includes processing circuitry 12 operatively associated with the communication circuitry 14 and configured to operate the UE 10 according to a same minimum processing time with respect to a scheduled carrier of the wireless communication network that has two scheduling carriers of differing numerologies. The same minimum processing time applies irrespective of which one of the two scheduling carriers is used to schedule the scheduled carrier for the UE.

As an example of the processing circuitry 12 operating the UE according to a same minimum processing time, the processing circuitry 12 in one or more embodiments is configured to determine, with respect to a particular scheduling occasion, whether a timing of scheduling of the UE 10 on the scheduled carrier satisfies the same minimum timing requirement.

The two scheduling carriers comprise, for example, a first scheduling carrier being associated with a first legacy minimum processing time, according to its numerology, and a second scheduling carrier being associated with a second legacy minimum processing time according to its numerology. The same minimum processing time determined by the UE 10 may be equal to the largest one of the first and second legacy minimum processing times, or may be larger than the largest one, e.g., by an additional relaxation amount. The processing circuitry 12 may be configured to apply the additional relaxation amount conditionally. Similarly, the processing circuitry 12 may be configured to use the same minimum processing time only under certain conditions, and use carrier-specific legacy processing time under other conditions.

For operating the UE 10 according to a same minimum processing time, the processing circuitry 12 in one or more embodiments is configured to perform one of: return an acknowledgment of a scheduled downlink transmission, responsive to a timing of the acknowledgment conforming to the same minimum processing time; or transmit uplink data, responsive to a timing of the transmission relative to reception of downlink control information scheduling the transmission conforming to the same minimum processing time.

Group A Examples

A1. A method performed by a User Equipment (UE) configured for operation in a wireless communication network, the method comprising the UE operating with a same minimum processing time with respect to a scheduled cell having two scheduling cells of differing numerologies, irrespective of which one of the two scheduling cells is used to schedule the scheduled cell for the UE.

A2. The method of example A1 wherein the UE operating with the same minimum processing time comprises operating with the same minimum processing time regarding the scheduled cell irrespective of whether scheduling information for scheduled use of the scheduled cell is received by the UE from a first one or a second one of the two scheduling cells.

A3. The method of example A1 or A2, wherein the same minimum processing time is a PDSCH processing time and comprises the minimum gap between the end of the reception by the UE of a PDSCH and the beginning of a corresponding PUSCH or PUCCH transmission with a HARQ-ACK for the received PDSCH.

A4. The method of example A1 or A2, wherein the same minimum processing time is a PUSCH processing time and comprises the minimum gap between the end of the reception by the UE of a PDSCH carrying DCI scheduling a PUSCH and the beginning of the PUSCH.

A5. The method of any of examples A1-A4, wherein the scheduled cell comprises a first Component Carrier (CC) in a Carrier Aggregation (CA) configuration, and wherein the two scheduling cells comprise the first CC and a second CC, such that the network schedules the UE on the first CC by sending scheduling information on either the first CC or the second CC.

A6. The method of example A5, wherein a first calculated minimum processing time corresponds to using the first CC to schedule the UE on the first CC and depends on numerologies used by the first CC, a second calculated minimum processing time corresponds to using the second CC to schedule the UE on the first CC and depends on numerologies used by the first and second CCs, and wherein the same minimum processing time is at least as large as the largest one of the first and second calculated minimum processing times.

A7. The method of any of examples A1-A6, further comprising sending information indicating a relaxation time to be used by the wireless communication network for determining the same minimum processing time.

A8. The method of any of examples A1-A7, wherein operating with the same minimum processing time is conditional, and wherein, responsive to the condition not being fulfilled, the UE operates with a different minimum processing time in dependence on whether the scheduled cell is scheduled via a first one of the two scheduling cells or a second one of the two scheduling cells.

A9. The method of example A8, wherein the condition for operating with the same minimum processing time is at least one of: the UE being scheduled via C-RNTI, CS-RNTI, or MCS-C-RNTI, or for PDSCH/PUSCH scheduling with non-fallback DCI formats (0-1/1-1/0-2/1-2).

A10. The method of example A9, wherein the UE uses a legacy minimum processing time regarding the scheduled cell, in cases where the UE is scheduled with fallback DCI format (0-0/1-0) and/or in common search space.

A11. A method performed by a UE with respect to a wireless communication network, the method comprising:

operating with a minimum processing time with respect to a first Component Carrier (CC) included in a Carrier Aggregation (CA) configuration associated with the UE, the minimum processing time being dependent on numerologies used by both of two CCs in the CA configuration used as scheduling carriers with respect to the first CC.

Group B Examples

B1. A method of operation by a network node of a wireless communication network, the method comprising:

determining a same minimum processing time for a User Equipment (UE) with respect to a first Component Carrier (CC) included in a Carrier Aggregation (CA) configuration associated with the UE, in dependence on numerologies used by both of two CCs in the CA configuration used as scheduling carriers with respect to the first CC.

B2. The example of B1, wherein the two scheduling carriers comprise the first CC and a second CC.

B3. The example of B2, wherein the first CC is a Primary CC and the second CC is a Secondary CC and wherein use of the Primary CC by the UE is schedulable via the Primary CC or the Secondary CC.

B4. The example of any of B1-B3, wherein a first minimum processing time for the UE applies with respect to the first CC being used to schedule the UE on the first CC and a second minimum processing time applies with respect to the second CC being used to schedule the UE on the first CC, and wherein the same minimum processing time determined for the UE is at least as large as the larger one of the first and second minimum processing times.

B5. The example of any of B1-B4, wherein the first CC is a first NR carrier operated in a spectrum-sharing arrangement and the second CC is a second NR that is not operated in a spectrum-sharing arrangement, and wherein the network node selectively uses either the first NR carrier or the second NR carrier to schedule the UE on the first NR carrier.

B6. The method of any of examples B1-B5, further comprising scheduling the UE on the first CC according to the same minimum processing time determined for the UE, irrespective of which scheduling carrier is used to schedule the UE on the first CC.

B7. A method of determining a minimum processing time for a User Equipment (UE) regarding a scheduled cell of a wireless communication network, where the scheduled cell has two scheduling cells, the method comprising:

determining, in a case where a calculated minimum processing time for the UE differs in dependence on whether the scheduled cell is scheduled for the UE via a first one or a second one of the two scheduling cells, a same minimum processing time for the UE that applies irrespective of whether the scheduled cell is scheduled using the first one or the second one of the two scheduling cells.

B8. A method of operation by a network node of a wireless communication network, the method comprising:

determining a same minimum processing time for a User Equipment (UE) regarding downlink or uplink processing with respect to a scheduled cell that has two scheduling cells, based on respective numerologies used in the two scheduling cells.

B9. The method of example B8, wherein a first calculated minimum processing time depends on a numerology used in a first one of the two scheduling cells, a second calculated minimum processing time depends on a numerology used in a second one of the two scheduling cells, and the same minimum processing time is at least as large as the largest one of the first and second calculated minimum processing times.

B10. The method of example B8 or B9, wherein the same minimum processing time is determined by taking the largest one of the first and second calculated minimum processing times and adding a relaxation time, the relaxation time being indicated by the UE.

B11. The method of any of examples B8-B10, wherein the same minimum processing time is a PDSCH processing time for processing a PDSCH received by the UE on the scheduled cell and returning a corresponding HARQ acknowledgement, or a PUSCH processing time for receiving DCI scheduling a PUSCH by the UE and the UE beginning transmission of the PUSCH.

B12. The method of any of examples B8-B11, wherein the scheduled cell is a Primary Serving Cell (PCell) of the UE and the two scheduling cells are the PCell for same-carrier scheduling and a Secondary Serving Cell (SCell) of the UE for cross-carrier scheduling.

B13. The method of example B12, wherein the PCell is a 5G NR cell based on a carrier that uses dynamic spectrum sharing for LTE communications, and wherein the SCell is another 5G NR cell based on a carrier that does not use dynamic spectrum sharing for the LTE communications.

B14. A method of determining a minimum processing time for a User Equipment (UE) regarding a scheduled cell of a wireless communication network, where the scheduled cell has two scheduling cells, the method comprising:

determining a same minimum processing time for the UE based on a capability reported by the UE, a subcarrier spacing associated with a first carrier of the network for which the UE is to be scheduled, and subcarrier spacings associated with two or more carriers that are selectively used by the network for scheduling the UE on the first carrier.

B15. The method of example B14, wherein a calculated minimum processing time applies with respect to each of the two or more carriers that are selectively used by the network for scheduling the UE on the first carrier, each such carrier referred to as a scheduling subcarrier, with the calculated minimum processing time for each scheduling carrier being a function of the subcarrier spacing associated with each scheduling carrier, and wherein the same minimum processing time for the UE is at least as large as the largest one of the calculated minimum processing times corresponding to the scheduling carriers.

B16. A method of operation by a network node of a wireless communication network, the method comprising:

determining a same minimum processing time for a User Equipment (UE) regarding downlink or uplink processing with respect to a scheduled cell that has two scheduling cells, based on considering a respective numerology used in each of the two scheduling cells.

B17. A method performed by a network node configured for operation in a wireless communication network, the method comprising:

determining a same minimum processing time for a UE with respect to a scheduled cell of a UE, irrespective of which one of two scheduling cells is used to schedule the scheduled cell for the UE.

Group C Examples

C1. A wireless device configured to perform any of the steps of any of the Group A examples.

C2. A wireless device comprising processing circuitry configured to perform any of the steps of any of the Group A examples.

C3. A wireless device comprising:
communication circuitry; and
processing circuitry configured to perform any of the steps of any of the Group A examples.

C4. A wireless device comprising:
processing circuitry configured to perform any of the steps of any of the Group A examples; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A examples.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A examples;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A examples.

C8. A carrier containing the computer program of example C7, wherein the carrier is one of an electronic signal, optical signal, radio signal, or computer readable storage medium.

C9. A radio network node configured to perform any of the steps of any of the Group B examples.

C10. A radio network node comprising processing circuitry configured to perform any of the steps of any of the Group B examples.

C11. A radio network node comprising:
communication circuitry; and
processing circuitry configured to perform any of the steps of any of the Group B examples.

C12. A radio network node comprising:
processing circuitry configured to perform any of the steps of any of the Group B examples; and
power supply circuitry configured to supply power to the radio network node.

C13. A radio network node comprising:
processing circuitry and memory, the memory containing instructions executable by the processing circuitry whereby the radio network node is configured to perform any of the steps of any of the Group B examples.

C14. The radio network node of any of examples C9-C13, wherein the radio network node is a base station.

C15. A computer program comprising instructions which, when executed by at least one processor of a radio network node, causes the radio network node to carry out the steps of any of the Group B examples.

C16. The computer program of example C14, wherein the radio network node is a base station.

C17. A carrier containing the computer program of any of examples C15-C16, wherein the carrier is one of an electronic signal, optical signal, radio signal, or computer readable storage medium.

Group D Examples

D1. A communication system comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B examples.

D2. The communication system of the previous example further including the base station.

D3. The communication system of the previous 2 examples, further including the UE, wherein the UE is configured to communicate with the base station.

D4. A communication system comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D5. The communication system of the previous embodiment, wherein the cellular network further includes a base station configured to communicate with the UE.

Terminology

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of operation by a network node of a wireless communication network, the method comprising:

determining a common minimum processing time for a User Equipment (UE) to be at least as large as the largest one of a first minimum processing time that applies with respect to use of a first scheduling carrier to schedule the UE on a scheduled carrier and a second minimum processing time that applies with respect to use of a second scheduling carrier to schedule the UE on the scheduled carrier; and scheduling the UE on the scheduled carrier according to the common minimum processing time, irrespective of whether the first or second scheduling carrier is used for the scheduling, wherein the scheduled carrier is a first Component Carrier (CC) in a Carrier Aggregation (CA) associated with the UE, and wherein the first scheduling carrier is the first CC and the second scheduling carrier is a second CC in the CA, wherein the first CC is a first New Radio (NR) carrier operated in a spectrum-sharing arrangement and the second CC is a second NR carrier that is not operated in a spectrum-sharing arrangement, and wherein the network node selectively uses either the first NR carrier or the second NR carrier to schedule the UE on the first NR carrier.

2. The method of claim 1, wherein the first and the second minimum processing times are legacy minimum processing times and differ as a consequence of the first and second scheduling carriers having different numerologies.

3. The method of claim 1, wherein scheduling the UE on the scheduled carrier according to the common minimum processing time comprises one of:

allowing at least the common minimum processing time at the UE for returning an acknowledgment of a downlink transmission to the UE; or allowing at least the common minimum processing time at the UE for beginning an uplink transmission subsequent to reception of control information scheduling the uplink transmission.

4. The method of claim 1, wherein scheduling the UE on the scheduled carrier according to the common minimum processing time comprises applying the common minimum processing time conditionally and, when the common minimum processing time is not applied for a particular scheduling occasion, applying a legacy processing time that is specific to the particular scheduling carrier used to schedule the UE on the scheduled carrier.

5. The method of claim 4, wherein the common minimum processing time is applied to scheduling occasions where one or more of the following conditions is satisfied:

the UE is scheduled using a Cell Radio Network Temporary Identifier (C-RNTI);

the UE is scheduled using a Configured Scheduling RNTI (CS-RNTI);

the UE is scheduled using a Modulation and Coding Scheme Cell RNTI (MCS-C-RNTI);

the UE is scheduled using non-fallback Downlink Control Information (DCI) formats 0-1/1-1/0-2/1-2; or the UE is scheduled using a common search space.

6. The method of claim 1, wherein, responsive to a certain condition being satisfied, determining the common minimum processing time for the UE comprises determining the common minimum processing time as a value equal to a relaxation value plus a greater one of the first minimum processing time and the second minimum processing time.

7. The method of claim 6, further comprising receiving an indication from the UE of the relaxation value.

8. A network node configured for operation in a wireless communication network, the network node comprising:
  communication circuitry; and
  processing circuitry operatively associated with the communication circuitry and configured to:
    determine a common minimum processing time for a User Equipment (UE) to be at least as large as the largest one of a first minimum processing time that applies with respect to use of a first scheduling carrier to schedule the UE on a scheduled carrier and a second minimum processing time that applies with respect to use of a second scheduling carrier to schedule the UE on the scheduled carrier; and
    schedule the UE on the scheduled carrier according to the common minimum processing time, irrespective of whether the first or second scheduling carrier is used for the scheduling, wherein the scheduled carrier is a first Component Carrier (CC) in a Carrier Aggregation (CA) associated with the UE, and wherein the first scheduling carrier is the first CC and the second scheduling carrier is a second CC in the CA, wherein the first CC is a first New Radio (NR) carrier operated in a spectrum-sharing arrangement and the second CC is a second NR carrier that is not operated in a spectrum-sharing arrangement, and wherein the processing circuitry is configured to use either the first NR carrier or the second NR carrier selectively, to schedule the UE on the first NR carrier.

9. A method performed by a User Equipment (UE) configured for operation in a wireless communication network, the method comprising:
  operating with a common minimum processing time with respect to a scheduled carrier of the wireless communication network which has two scheduling carriers of differing numerologies, the common minimum processing time applied irrespective of which one of the two scheduling carriers is used to schedule the scheduled carrier for the UE, wherein the scheduled carrier is a first Component Carrier (CC) in a Carrier Aggregation (CA) associated with the UE, and wherein the first scheduling carrier is the first CC and the second scheduling carrier is a second CC in the CA, wherein the first CC is a first New Radio (NR) carrier operated in a spectrum-sharing arrangement and the second CC is a second NR carrier that is not operated in a spectrum-sharing arrangement, and wherein the wireless communication network selectively uses either the first NR carrier or the second NR carrier to schedule the UE on the first NR carrier.

10. The method of claim 9, wherein operating with the common minimum processing time comprises determining, with respect to a particular scheduling occasion, whether a timing of scheduling of the UE on the scheduled carrier satisfies the common minimum processing time.

11. The method of claim 9, wherein a first one of the two scheduling carriers corresponds to a first legacy minimum processing time and a second one of the two scheduling carriers corresponds to a second legacy minimum processing time, and wherein the first and the second legacy minimum processing times differ as a consequence of the first and second scheduling carriers having different numerologies.

12. The method of claim 9, wherein operating with the common minimum processing time comprises one of:
  returning an acknowledgment of a scheduled downlink transmission, responsive to a timing of the acknowledgment conforming to the common minimum processing time; or
  transmitting uplink data, responsive to a timing of the transmission relative to reception of downlink control information scheduling the transmission conforming to the common minimum processing time.

13. The method of claim 9, wherein operating with the common minimum processing time with respect to the scheduled carrier comprises operating with the common minimum processing time responsive to a certain condition being satisfied, and otherwise operating with either a first minimum processing time or a second minimum processing time, the first minimum processing time used by the UE responsive to the certain condition not being satisfied and a first one of the two scheduling carriers being used to schedule the UE on the scheduled carrier and the second minimum processing time used by the UE responsive to the certain condition not being satisfied and a second one of the two scheduling carriers being used to schedule the UE on the scheduled carrier.

14. The method of claim 13, wherein the certain condition is any one or more of:
  the UE is scheduled using a Cell Radio Network Temporary Identifier (C-RNTI);
  the UE is scheduled using a Configured Scheduling RNTI (CS-RNTI);
  the UE is scheduled using a Modulation and Coding Scheme Cell RNTI (MCS-C-RNTI);
  the UE is scheduled using non-fallback Downlink Control Information (DCI) formats 0-1/1-1/0-2/1-2; or
  the UE is scheduled using a common search space.

15. The method of claim 9, wherein the common minimum processing time is a Physical Downlink Shared Channel (PDSCH) processing time and comprises a minimum gap between the end of a reception by the UE of a PDSCH and the beginning of a corresponding Physical Uplink Shared Channel (PUSCH) or Physical Uplink Control Channel (PUCCH) transmission with a Hybrid Automatic Repeat reQuest Acknowledgment (HARQ-ACK) for the received PDSCH.

16. The method of claim 9, wherein the common minimum processing time is a PUSCH processing time and comprises a minimum gap between the end of the reception by the UE of a PDSCH carrying DCI scheduling a PUSCH and the beginning of the PUSCH.

17. The method of claim 9, wherein a first minimum processing time applies with respect to use of a first one of the two scheduling carriers to schedule the scheduled carrier for the UE and a second minimum processing time applies with respect to use of a second one of the two scheduling carriers to schedule the scheduled carrier for the UE, wherein, at least for certain conditions, the common minimum processing time is a larger one of the first and second minimum processing times plus a relaxation value, and wherein the method further comprises the UE indicating the relaxation value to a network node of the wireless communication network.

18. A User Equipment (UE) configured for operation in a wireless communication network, the UE comprising:
  communication circuitry; and processing circuitry operatively associated with the communication circuitry and configured to:

operate the UE according to a common minimum processing time with respect to a scheduled carrier of the wireless communication network that has two scheduling carriers of differing numerologies, the common minimum processing time applied irrespective of which one of the two scheduling carriers is used to schedule the scheduled carrier for the UE, wherein the scheduled carrier is a first Component Carrier (CC) in a Carrier Aggregation (CA) associated with the UE, and wherein the first scheduling carrier is the first CC and the second scheduling carrier is a second CC in the CA, wherein the first CC is a first New Radio (NR) carrier operated in a spectrum-sharing arrangement and the second CC is a second NR carrier that is not operated in a spectrum-sharing arrangement, and wherein the wireless communication network selectively uses either the first NR carrier or the second NR carrier to schedule the UE on the first NR carrier.

\* \* \* \* \*